Feb. 16, 1932.   H. H. CRAWFORD   1,845,485
THERMOSTATICALLY CONTROLLED SHUTTER
Filed Oct. 7, 1929   2 Sheets-Sheet 1
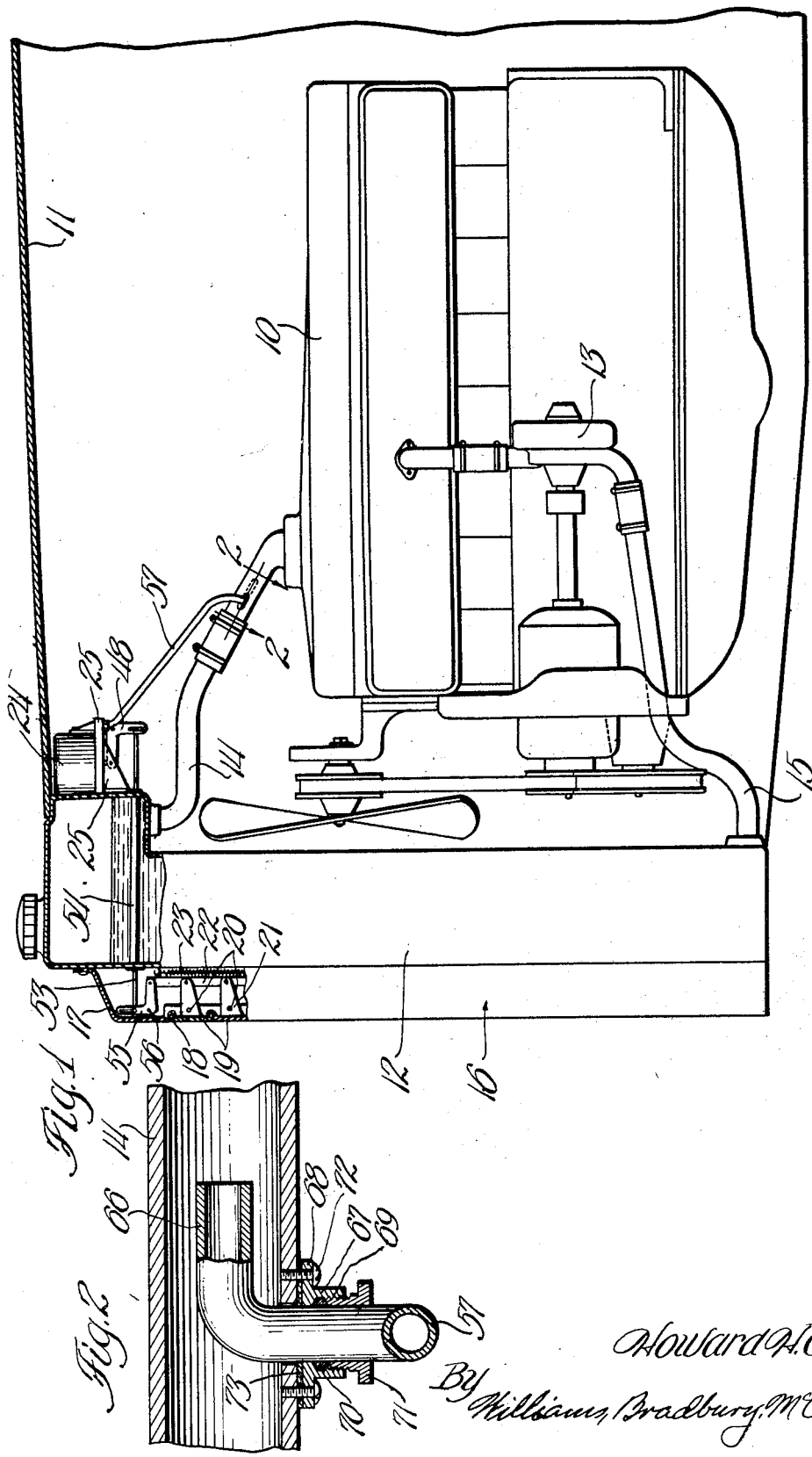
Inventor:
Howard H. Crawford
By Williams, Bradbury, McCaleb + Hinkle
Attys.

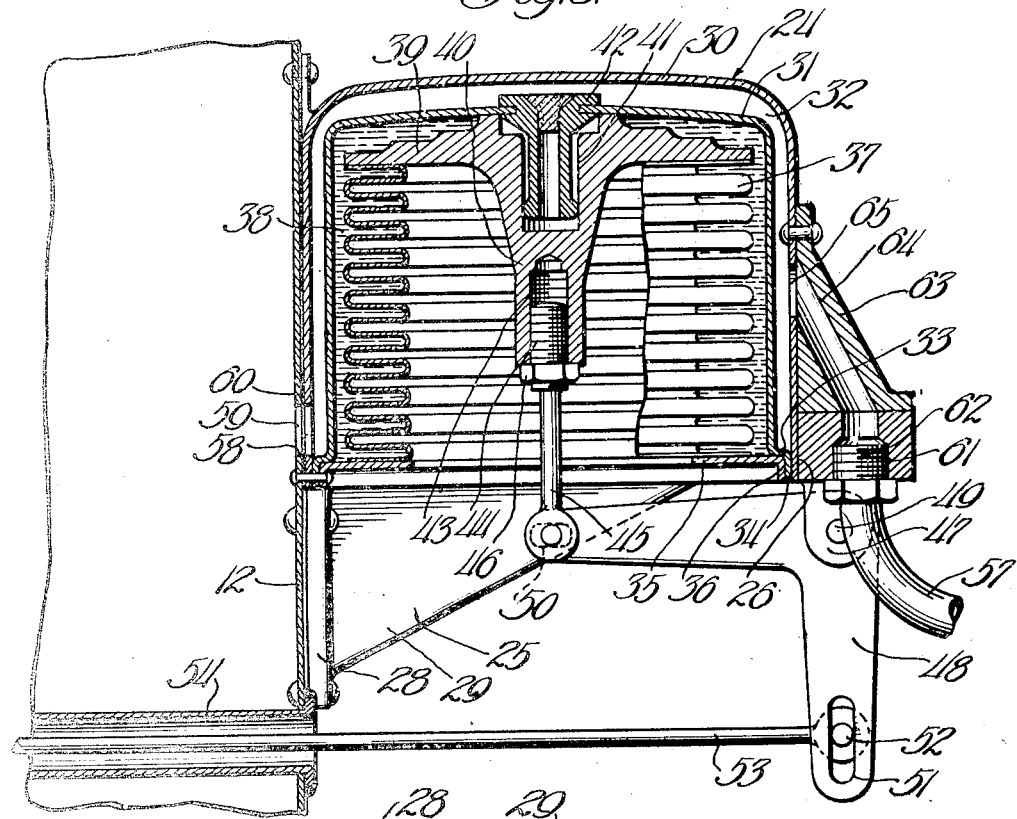
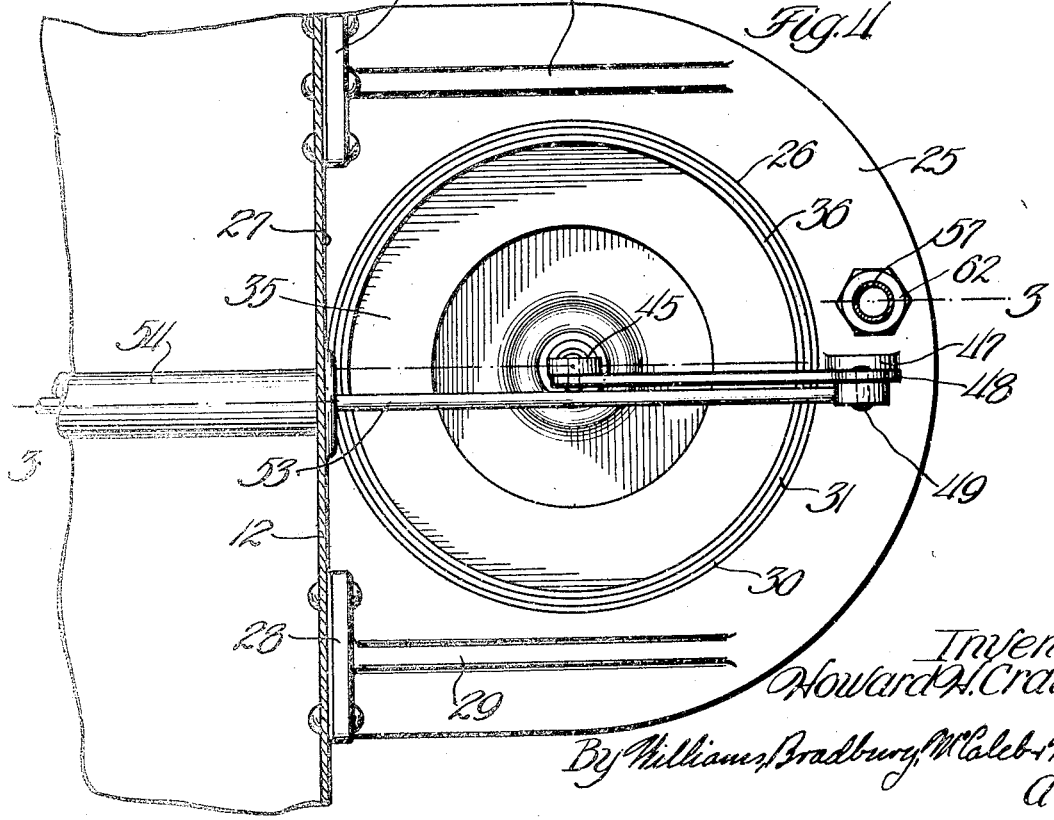

Patented Feb. 16, 1932

1,845,485

UNITED STATES PATENT OFFICE

HOWARD H. CRAWFORD, OF DETROIT, MICHIGAN, ASSIGNOR TO PINES WINTERFRONT COMPANY, OF CHICAGO, ILLINOIS, A CORPORATION OF DELAWARE

THERMOSTATICALLY CONTROLLED SHUTTER

Application filed October 7, 1929. Serial No. 397,896.

The present invention relates to thermostatically controlled shutters, and is particularly concerned with shutters for controlling the flow of cooling air through the radiator used for cooling an internal combustion engine.

One of the objects of the present invention is the provision of an improved thermostatically controlled shutter device which has new and desirable operating characteristics.

In the thermostatic shutters of the prior art, it has been necessary to locate the thermostat in that part of the water cooling system where the water of the desired operating temperature is apt to be encountered, but this imposes certain restrictions of design on the manufacturer, and the prior devices could only be located to be responsive to water at a certain point in the system. It is also very desirable that the controlling devices be adapted to open the shutters very quickly when the engine has registered a predetermined operating temperature, and that the shutters be closed very quickly as soon as the engine has stopped, but considerable time is required for the cooling of the thermostatic devices of the prior art when they are located to be quickly responsive to an increase in temperature of the engine.

Another object of the invention is the provision of a thermostatic control for radiator shutters, which is adapted to open the shutters promptly at a predetermined operating temperature, and close the shutters soon after the engine has stopped, in order to conserve the heat of the engine.

Another object is to provide a system in which the shutter controlling thermostat is responsive to the temperature of the hottest liquid in the cooling system when the engine is in operation, and which is adapted to permit the shutters to close soon after the engine stops.

Other objects of the invention are to utilize the suction of a liquid circulating pump and the velocity head of the cooling liquid flowing from the engine water jackets to the radiator to maintain a continuous flow of hot liquid to the thermostat when the engine is in operation, and to utilize the siphoning effect of the liquid circulating system to drain the thermostat liquid chamber quickly when the engine stops, to permit the thermostat to cool more quickly and to close the shutters.

Another object is the provision of a thermostatic controlling device for shutters, which may be located in such manner as to be concealed by the hood and also in the most convenient and accessible location when the hood is opened.

Other objects and advantages of the invention will be apparent from the following description and from the accompanying drawings, in which similar characters of reference indicate similar parts throughout the several views.

Referring to the drawings, of which there are two sheets;

Fig. 1 is a diagrammatic, elevational view in partial section, showing the application of the present invention to one type of internal combustion engine;

Fig. 2 is a sectional view taken on the plane of the line 2—2 of Fig. 1, looking in the direction of the arrows;

Fig. 3 is a sectional view taken on the plane of the line 3—3 of Fig. 4; and

Fig. 4 is a plan view of the thermostatic controlling device with a part of the radiator.

The embodiment which has been selected to illustrate the invention includes an internal combustion engine 10, which is enclosed in the usual hood 11, and provided with a water circulating system including a radiator 12. The engine is provided with a water circulating system which includes the water jacket about the engine 10, a pump 13, the radiator 12 and conduits 14 and 15, connecting the water jacket and the radiator at the bottom and top of the system, respectively. The pump 13 may be actuated by the internal combustion engine 10 in any convenient way, and the pump is preferably located in a lower part of the circulation system between the conduit 15 and the water jacket of the engine 10.

The shutter device 16 of the present embodiment comprises a detachable radiator shutter consisting of a shutter frame 17, which is formed with a centrally located opening 18 for the passage of air through the core of the radiator 12, and the opening 18 is adapted to be closed by a plurality of shutters 19, which are pivotally mounted on the frame at the points 20. Each of the shutters is provided with actuating means consisting of a rearwardly extending arm 21, and the arms 21 of the shutters are pivotally connected to a shutter actuating bar 22, so that all of the shutters, or a group thereof, may be opened or closed at the same time. In the preferred embodiment, the shutters 19 are urged to closed position by a spring 23 tensioned between the shutter bar 22 and the frame 17, and urging the shutter bar 22 upward so that the shutters 19 may be opened by movement of the shutter bar 22 downward against the tension of the spring 23.

It should be understood that the specific details or construction of the engine or shutters may be varied infinitely without affecting the merits of the invention, and the present invention is equally applicable to built-in shutters as well as the detachable shutters of the type illustrated.

The thermostatic device which is shown in elevation in Fig. 1, and indicated in its entirety by the numeral 24, is illustrated in detail in Figs. 3 and 4. This device preferably includes a supporting member 25 which may comprise an annular metal casting formed with a central aperture 26 and with one flat side 27 for engagement with the wall of the radiator 12. The supporting member 25 is preferably formed with integral attaching flanges 28 adjacent the flat side of the supporting member, and with tapered reinforcing ribs 29 extending from the flanges 28 to the lower surface of the ring 25. The thermostatic device 24 may also include a pair of substantially cylindrical casing members 30 and 31, the latter of which is smaller in diameter for the purpose of forming an annular liquid chamber 32. The inner casing 31 is therefore provided with a laterally projecting flange 33 and with a cylindrical flange 34 of the same outer diameter as the interior diameter of the casing 30, thereby closing the lower end of the annular liquid chamber 32.

In order to locate the thermostatic device in close heat conducting relation with the liquid in the chamber 32, the inner chamber 31 preferably forms one of the walls of the thermostatic device and this wall is preferably constructed of material having high heat conductive properties, such as aluminum, although other metals may be used.

The thermostatic device 24 is also provided with an annular supporting member 35 comprising a sheet metal ring with a substantially cylindrical flange 36 adapted to be complementary to the interior surface of the flange 34 carried by casing 31, and the annular member 35 provides a support for one end of a flexible and extensible metal member or bellows 37 which is adapted to be contracted by the expansion of a thermal fluid 38 located between the bellows 37 and the inner casing 31. The annular member 35 thus provides a closure for the lower end of the thermostatic chamber which contains the thermal fluid 38. The thermal fluid 38 may consist of a highly volatile liquid or gas.

The flanges 34, 36 and the lower edge of the outer casing 30 may be riveted or spot-welded together, and the supporting member or bracket 35 may be riveted to the wall of a radiator 12, the thermostatic device being located above the water line in the radiator.

The upper end of the bellows 37 is closed by being secured to a circular member 39 which is formed with an axially located lug 40 adapted to provide a connection between the bellows and the shutter actuating mechanism. The axial lug 40 is preferably provided with an axial bore 41 which cooperates with a cylindrical guide member 42 carried by the inner casing 31 and projecting into the bore 41 to maintain the alignment of the upper end of the bellows 37. The lower end of the lug 40 is provided with a threaded bore 43 adapted to receive the threaded end 44 of a connecting rod 45 secured in place by a lock nut 46.

The supporting member 25 is also provided with a depending bearing flange 47 which pivotally supports a bell crank lever 48 by means of a rivet 49. One arm of the bell crank lever 48 is provided with a pin and slot connection 50 pivotally connecting the bell crank with the connecting rod 45, and the other arm of the bell crank 48 is provided with a slot 51 for slidably and pivotally receiving a rivet 52, carried by the end of a second connecting rod 53.

The second connecting rod 53 may pass through any of the usual interstices or openings provided for the passage of air through the radiator or the radiator may be provided with a special conduit 54 through the upper part of the water box for accommodating the connecting rod 53. The opposite end of the connecting rod 53 is slidably and pivotally connected to one arm of a bell crank 55, the bell crank 55 being pivotally mounted on the shutter frame 56, and having its other arm pivotally connected with the shutter actuating bar 22.

As previously stated, the thermostatic device 24 is preferably located above the water line of the radiator, and in order to supply the liquid chamber 32 with part of the hottest water of the liquid circulating system, a conduit 57 is provided which is in communication with the water circulating system and pump.

The outer casing 30 may also be provided with means for draining the water supplied by the conduit 57, which may comprise a drain opening 58 in the wall of casing 30, immediately adjacent radiator 12, the drain opening 58 being in registry with the drain opening 59 in the radiator wall. In order to provide a water-tight joint about the openings 58, 59, suitable gaskets 60 are inserted between the thermostatic device 24 and the radiator 12.

In order to connect the conduit 57 with the liquid chamber 32, the supporting member 25 may be provided with a threaded bore 61 for receiving the fitting 62 carried by the end of the metal conduit 57. An auxiliary metal fitting 63 may be provided, or this member may be an integral part of the supporting member 25, for providing a conduit 64 leading from the bore 61 to an aperture 65 located in the side wall of the outer casing 30, preferably adjacent an upper part of the fluid chamber 32.

The lower end of the conduit 57 is preferably provided with means for directing the flowing liquid in the circulating system, into the conduit 57, which may consist of a laterally turned portion 66 located in the conduit 14 of the liquid circulating system, and pointing in the direction opposite to the flow of the liquid. The end 66 of the conduit 57 is, of course, smaller than conduit 14, so that only a portion of the liquid passing through conduit 14 is directed into conduit 36 and conducted to the annular chamber 32 about the thermostatic device.

Since the conduit 57 has its end located at the upper discharge point of the water jacket, a part of the hottest water from the water jacket will be brought into contact with the thermostatic device, thereby insuring an adequate supply of heat for actuating the thermostat when the engine reaches the predetermined operating temperature. The flow of liquid in the conduit 57 is the result of pressure developed by the velocity head of the liquid in the conduit 14.

In order to attach conduit 57 to conduit 14, the conduit 57 may be provided with a fitting 67 having curved attaching flanges 68 for engagement with the walls of conduit 14 and having a threaded socket 69 about conduit 57 for receiving a soft metal packing 70 which may be compressed by a gland 71. The attaching flanges 68 are secured to conduit 14 by screw bolts 72 with a suitable gasket 73 between flanges 68 and conduit 14.

The operation of the present temperature regulating system is as follows:

When the engine is at rest and cold, the shutters 19 are maintained in closed position by the spring 23. As soon as the engine starts, the water in the circulating system is heated by the combustion in the engine and the water is caused to circulate by the pump 13. A portion of the hottest water from the engine, which would naturally be located at the top of the water jacket, is diverted from the conduit 14 through conduit 57 to the liquid chamber 32 about the thermostatic chamber 38, but the shutters are maintained in closed position until the engine has reached a predetermined operating temperature.

When the water has reached a predetermined temperature, the thermal fluid 38 will expand, causing the bellows 37 to contract, and moving the connecting rod 45 downward. The bell crank 48 will be rotated counter-clockwise, moving connecting rod 53 to the right, rotating bell crank 55 clockwise, moving shutter bar 22 downward and opening shutters 19 against tension of spring 23.

The water conveyed to the liquid chamber 32 will be continuously discharged through the apertures 58, 59 and as soon as the engine is stopped, the liquid chamber 32 will be drained, not only by the drain apertures 58, 59, but by the settling back of the water in the conduit 57, so that the liquid chamber 32 is drained quickly when the engine is stopped. The thermostatic device may therefore cool more quickly than the devices of the prior art, which are maintained in continuous contact with the water or other parts of the system, and the shutters 19 will be closed soon after the engine stops, to conserve the heat of the engine.

It will thus be observed that I have invented an improved temperature regulating system for internal combustion engines, including a thermostatic device which is subjected to the heat of some of the hottest water of the system when the engine is operating, but which is drained as soon as the engine is stopped, so that the thermostat may cool more quickly to close the shutters. The present thermostatic controlling device may be located within the hood, where it is concealed, but where it is most conveniently located for adjustments or repair at the top of the space within the hood.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what

I claim is new and desire to secure by Letters Patent of the United States, is:

1. A thermostatically actuated controlling device for use with cooling systems of internal combustion engines, comprising a liquid chamber for the cooling liquid of a circulation system, a thermostat carried by said chamber and responsive to the temperature of the liquid in said chamber, an internal combustion engine, and means for draining liquid from said chamber when said engine stops, to effect rapid cooling of said thermostat.

2. A thermostatically actuated controlling device for use with cooling systems of internal combustion engines, comprising a liquid chamber for the cooling liquid of a circulation system, a thermostat carried by said chamber and responsive to the temperature of the liquid in said chamber, an internal combustion engine, means for draining liquid from said chamber when said engine stops, to effect rapid cooling of said thermostat, and shutter means actuated by said thermostat for controlling the flow of cooling air about said engine.

3. A thermostatically actuated controlling device for use with cooling systems of internal combustion engines, comprising a liquid chamber for the cooling liquid of a circulation system, a thermostat carried by said chamber and responsive to the temperature of the liquid in said chamber, an internal combustion engine, said chamber being located above the water line of said cooling system, and means for draining said chamber into said liquid system.

4. A thermostatically actuated controlling device for use with cooling systems of internal combustion engines, comprising a liquid chamber for the cooling liquid of a circulation system, a thermostat carried by said chamber and responsive to the temperature of the liquid in said chamber, an internal combustion engine, said chamber being located above the water line of said cooling system, means for draining said chamber into said liquid system, a liquid pump in said system, and a conduit for conducting water pressure from said pump to said liquid chamber.

5. In a temperature regulating system for internal combustion engines, the combination of an engine having a liquid circulating system, a pump and a radiator, with a plurality of shutters for regulating the flow of cooling air through said radiator, a thermostat for controlling said shutters, and means for subjecting said thermostat to the heat of the liquid of said system only while the engine is running.

6. In a temperature regulating system for internal combustion engines, the combination of an engine having a liquid circulating system, a pump and a radiator, with a plurality of shutters for regulating the flow of cooling air through said radiator, a thermostat for controlling said shutters, a separate liquid chamber adjacent said thermostat, and means for draining said chamber when the engine stops.

7. In a temperature regulating system for internal combustion engines, the combination of an engine having a liquid circulating system, a pump and a radiator, with a plurality of shutters for regulating the flow of cooling air through said radiator, a thermostat for controlling said shutters, a separate liquid chamber adjacent said thermostat, means for draining said chamber, and means for connecting said pump to said liquid chamber to subject said thermostat to the heat of the liquid of said system.

8. A controlling device for radiator shutters, comprising a member having a pair of cylindrical casings forming an annular liquid chamber, an expansible bellows having one end fixed to said member, and having its opposite end closed, forming an expansible annular chamber, said member having a drainage opening, a shutter and operative mechanical connections between said bellows and shutter, and a conduit for connecting said liquid chamber to the liquid pump of an engine, to supply liquid when said engine is running.

9. A controlling device for radiator shutters, comprising a member having a pair of cylindrical casings forming an annular liquid chamber, an expansible thermostatic member having one end fixed to said member, and having its opposite end closed, forming an expansible annular chamber, said member having a drainage opening, a shutter and operative mechanical connections between said thermostatic member and shutter, and a conduit for connecting said liquid chamber to the liquid pump of an engine, to supply liquid when said engine is running, said conduit having a deflecting member for location in a conduit of the liquid circulation system of an internal combustion engine.

10. A controlling device for radiator shutters, comprising a member having a pair of cylindrical casings forming an annular liquid chamber, an expansible bellows having one end fixed to said member, and having its opposite end closed by a metal guide member, forming an expansible annular chamber, a cooperating guide member carried by said chamber, said member having a drainage opening, a shutter and operative mechanical connections between said bellows and shutter, and a conduit for connecting said liquid chamber to the liquid pump of an engine, to supply liquid when said engine is running.

11. In a shutter device for internal combustion engines, the combination of an engine having a cooling system with a cooling agent, with a plurality of shutters for controlling the flow of air in said cooling system, a thermostatic device for controlling said shutters, said thermostatic device being located out of the normal field of said cooling agent, and means actuated by the running of the engine for directing the cooling agent into contact with the thermostatic device whereby the thermostatic device is directly responsive to the temperature of the cooling agent only when the engine is running so that the shutters are closed as soon as the engine stops.

In witness whereof, I hereunto subscribe my name this 30th day of September, 1929.

HOWARD H. CRAWFORD.